United States Patent
Kousoulis et al.

(10) Patent No.: US 10,454,773 B2
(45) Date of Patent: Oct. 22, 2019

(54) VIRTUAL MACHINE MOBILITY

(71) Applicant: Nutanix, Inc., San Jose, CA (US)

(72) Inventors: Constantine Andrew Kousoulis, San Jose, CA (US); Karthik Chandrasekaran, Bangalore (IN); Srinivas Bandi Ramesh Babu, Mountain View, CA (US); Sudish Kumar Sah, Bangalore (IN)

(73) Assignee: NUTANIX, INC., San Jose, CA (US)

(*) Notice: Subject to any disclaimer, the term of this patent is extended or adjusted under 35 U.S.C. 154(b) by 280 days.

(21) Appl. No.: 15/362,715

(22) Filed: Nov. 28, 2016

(65) Prior Publication Data

US 2018/0152352 A1 May 31, 2018

(51) Int. Cl.
*H04L 12/24* (2006.01)
*G06F 9/455* (2018.01)
*H04L 29/08* (2006.01)

(52) U.S. Cl.
CPC .......... *H04L 41/12* (2013.01); *G06F 9/45558* (2013.01); *G06F 2009/4557* (2013.01); *H04L 67/10* (2013.01)

(58) Field of Classification Search
CPC .............................. H04L 41/12; H04L 67/10
USPC ......................................................... 709/223
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,052,936 B1* | 6/2015 | Aron | G06F 9/45533 |
| 9,772,866 B1 | 9/2017 | Aron et al. | |
| 2007/0067435 A1* | 3/2007 | Landis | G06F 9/5016 709/224 |
| 2009/0150528 A1* | 6/2009 | Tanabe | H04L 41/0806 709/221 |

OTHER PUBLICATIONS

Can we do failover clustering with Hypervisor, social.technet.microsoft.com, Oct. 24, 2011 (3 pages).*

(Continued)

*Primary Examiner* — Wing F Chan
*Assistant Examiner* — Leon Y Tseng
(74) *Attorney, Agent, or Firm* — Foley & Lardner LLP

(57) ABSTRACT

Particular embodiments comprise (1) a cluster of host machines, each comprising at least one virtual machine (VM), one or more virtual infrastructure elements, and one or more required drivers for implementing the virtualization environment, and (2) a target host machine capable of implementing the virtualization environment based on a second platform, wherein the target host machine comprises at least one VM and one or more virtual infrastructure elements. A management module for the system performs steps to move one of the VMs from the cluster of host machines to the target host machine by checking whether the target host machine comprises one or more required drivers for implementing the virtualization environment and, if the target host machine comprises the one or more required drivers, activating the one or more required drivers, and sending a confirmation signal back to a control plane in the cluster of host machines.

20 Claims, 9 Drawing Sheets

(56) References Cited

OTHER PUBLICATIONS

Hyper-V: Using Hyper-V and Failover Clustering, docs.microsoft.com, Jul. 1, 2012 (25 pages).*
Failover Cluster for use with Hyper-V (requirements), social.technet.microsoft.com, Sep. 5, 2013 (1 page).*
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.

* cited by examiner

VIRTUAL MACHINE MOBILITY

TECHNICAL FIELD

This disclosure generally relates to transferring virtual machines between nodes within a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

SUMMARY OF PARTICULAR EMBODIMENTS

The present invention provides an architecture for transferring one or more user VMs (UVMs) from a failed node to an available host machine. A cluster of physical nodes or host machines (e.g., servers) may operate on the same network and share various storage devices. Each node may comprise one or more user UVMs, one or more controller/service VMs (CVMs), and a hypervisor, all of which may operate on the node. One node may be designated as a leader node. The leader node, via its controller/service virtual machine, may monitor the activity of the hypervisors operating on the other nodes. If a hypervisor on one of the other nodes fails, the leader node—via its controller/service virtual machine—may detect that this hypervisor is unreachable. This may mean that the node on which the hypervisor operates has potentially failed or is otherwise potentially corrupted. This node may be referred to as a failed node, regardless of whether the node has actually failed. The leader node and other live nodes may treat the unreachable node as a failed node. One or more UVMs may be operating on the failed node. These UVMs may need to be transferred from the failed node to another node that has adequate resources to operate the UVMs. The leader node may identify a target node to which the UVMs from the failed node may be transferred. Before transferring the UVMs to the target node, the leader node may first determine if (1) the target node has all the required drivers to successfully operate the UVMs; and (2) the installed drivers are activated on the target node. If either of these conditions is not met, the leader node may take preparatory steps to move the UVMs to the target node. These preparatory steps may include installing the requisite drivers, activating the requisite drivers, or both installing and activating the requisite drivers for the transferred UVMs to operate normally.

The present invention provides an architecture for implementing driver installation and activation in a virtualization environment. According to some embodiments, a management module is employed to control the conversion of hypervisors. The management module may also be referred to as a control plane in the CVM.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, if a hypervisor on a host machine within a cluster of host machines fail, the leader node—via its controller/service virtual machine—may detect that this hypervisor is unreachable and that the host machine that maintains the failed hypervisor has also failed. The UVMs on the failed host machine may need to be transferred from the failed host machine to another node that has adequate resources to maintain the UVMs. The leader node (e.g., via a management module) may identify a target node (which may also be referred to as a target host machine) to which the UVMs from the failed node may be transferred. Before transferring the UVMs to the target node, the leader node may first determine if (1) the target node has all the required drivers to successfully operate the UVMs; and (2) the installed drivers are activated on the target node. If either of these conditions are not met, the leader node may take preparatory steps to move the UVMs to the target node. These preparatory steps may include installing the requisite drivers, activating the requisite drivers, or both installing and activating the requisite drivers for the transferred UVMs to operate normally.

Figure 1A:
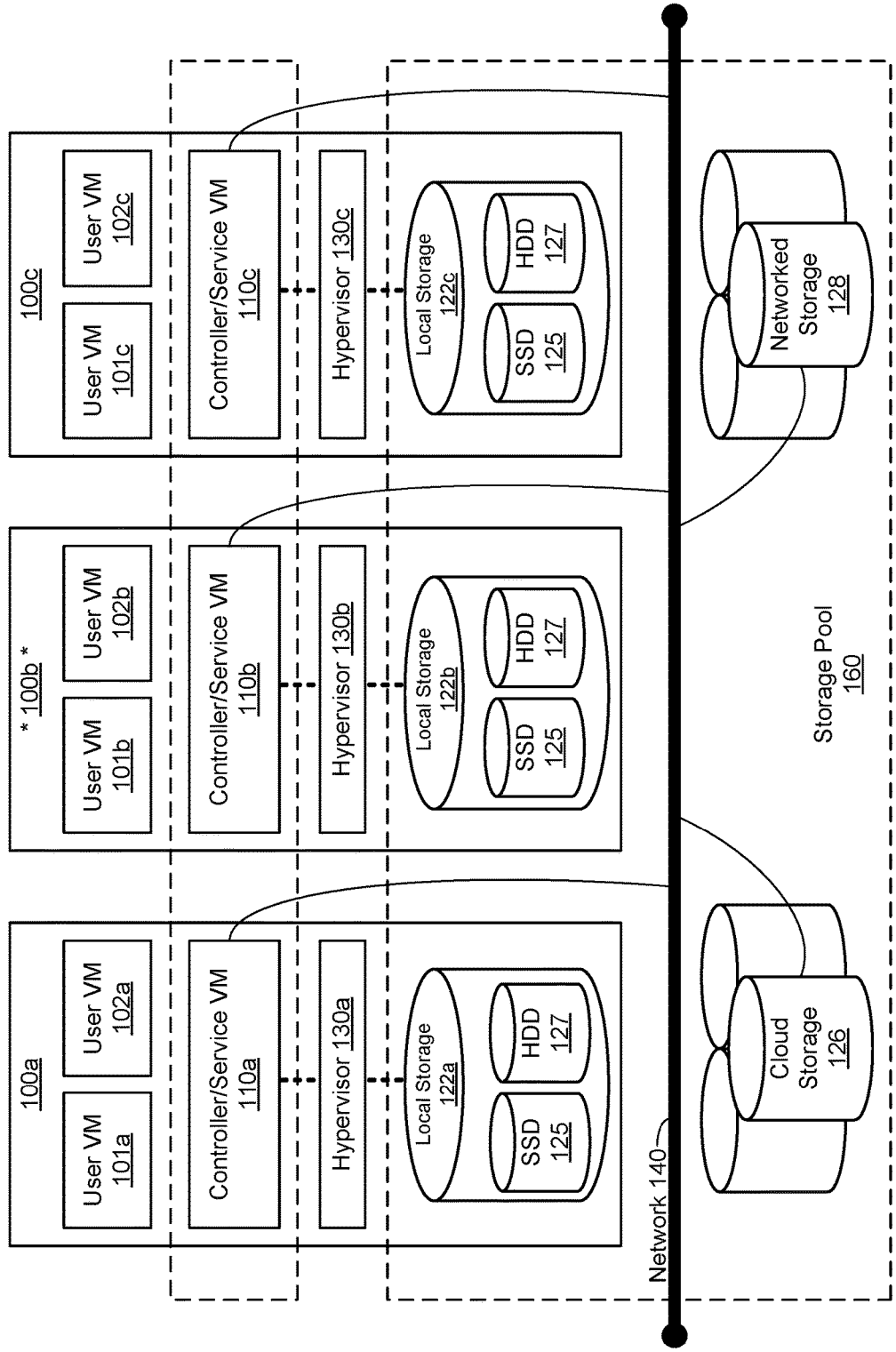
FIG. 1A illustrates a clustered virtualization environment according to particular embodiments.

FIG. 1A illustrates a clustered virtualization environment according to particular embodiments. The architecture of FIG. 1A can be implemented for a distributed platform that contains multiple host machines 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits local storage 122a-c that is within or directly attached to the server and/or appliance to be managed as part of storage pool 160. Examples of such storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM (CVM) 110 to be used by a user VM. In some embodiments, the vDisk is exposed via iSCSI ("internet small computer system interface") or NFS ("network file system") and is mounted as a virtual disk on the user VM.

Each host machine 100a-c runs virtualization software, such as VMWARE ESX(I), MICROSOFT HYPER-V, or REDHAT KVM. The virtualization software includes hypervisor 130a-d to manage the interactions between the underlying hardware and the one or more user VMs 101a, 102a, 101b, 102b, 101c, and 102c that run client software. Though not depicted in FIG. 1A, a hypervisor may connect to network 140. In particular embodiments, a host machine 100 may be a physical hardware computing device; in particular embodiments, a host machine 100 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 100, and work together to form a distributed system 110 that manages all the storage resources, including local storage 122, networked storage 128, and cloud storage 126. The CVMs may connect to network 140 directly, or via a hypervisor. Since the CVMs run independent of hypervisors 130a-d, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 100b, as indicated by the asterisks, may be a leader node. A leader node may have a software component designated to perform operations of the leader. For example, CVM 110b on host machine 100b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 101a-c and 102a-c. These disks are virtual, since they are implemented by the software running inside CVMs 110a-c. Thus, to user VMs 101a-c and 102a-c, CVMs 110a-c appear to be exporting a clustered storage appliance that contains some disks. All user data (including the operating system) in the user VMs 101a-c and 102a-c reside on these virtual disks.

Significant performance advantages can be gained by allowing the virtualization system to access and utilize local storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
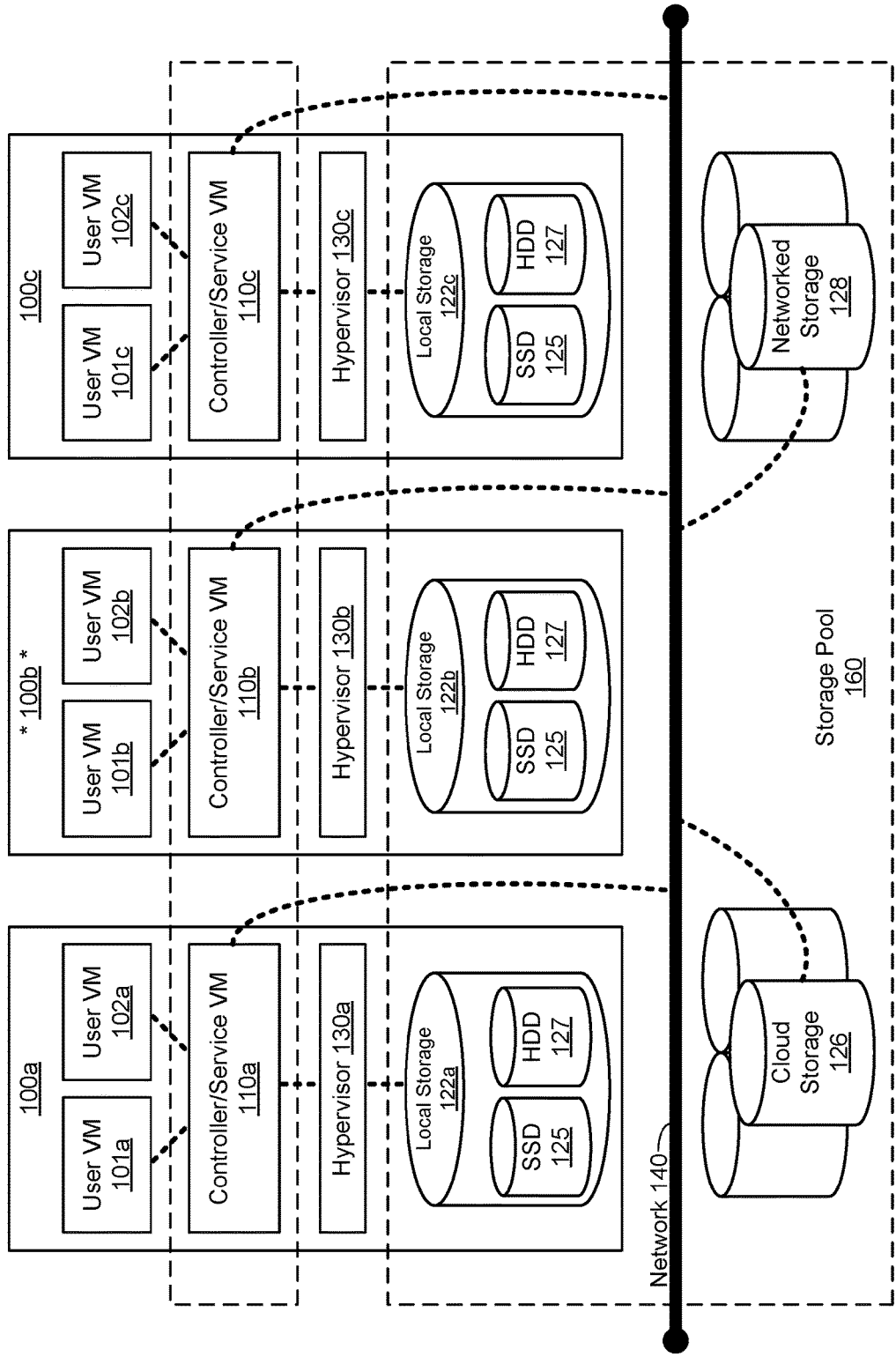
FIG. 1B illustrates data flow within a clustered virtualization environment according to particular embodiments.

FIG. 1B illustrates data flow within an example clustered virtualization environment according to particular embodiments. As described above, one or more user VMs and a CVM may run on each host machine 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 100a, by connecting via network 140 to cloud storage 126 or networked storage 128, or by connecting via network 140 to local storage 122b-c within another host machine 100b-c (e.g., via connecting to another CVM 110b or 110c). In particular embodiments, any suitable computing system 400 may be used to implement a host machine 100.

In particular embodiments, an architecture for transferring one or more UVMs from a failed host machine to an available host machine is provided. FIGS. 2A-2E illustrate an example architecture for transferring UVMs from a failed host machine to an available host machine. A cluster of servers 100a-d may be connected via network 140. Servers 100a-d may also be referred to as host machines, or, more simply, as nodes of the cluster. Host machine 100c may be designated as a leader node within the cluster. Leader node 100c may monitor the operation of the hypervisors 110a, 110b, and 110d on the other nodes 100a, 100b, and 100d. In particular embodiments, leader node 100c may monitor the operation of other elements by way of a connection manager located on leader node 100c. The connection manager may poll one or more I/O controllers located on the other nodes 100a, 100b, and 100d by periodically "pinging" them (e.g., by sending an echo-request, waiting to receive an echo-response, and, if received, measuring the round-trip time from transmission to reception, reporting errors and packet loss, else if not received, generating an error message). For example, when using the iSCSI transport protocol, the connection manager may periodically send a NOP-OUT request to all I/O controllers on nodes 100a, 100b, and 100d, with the expectation that any available I/O controllers will send back an NOP-IN response within a reasonable time. In particular embodiments, the echo-response from each I/O controller may include additional information regarding the I/O controller, such as its current and/or historical load or its capabilities. Although this disclosure describes maintaining a virtualization environment in a particular manner, this disclosure contemplates maintaining a virtualization environment in any suitable manner.

Figure 2A:
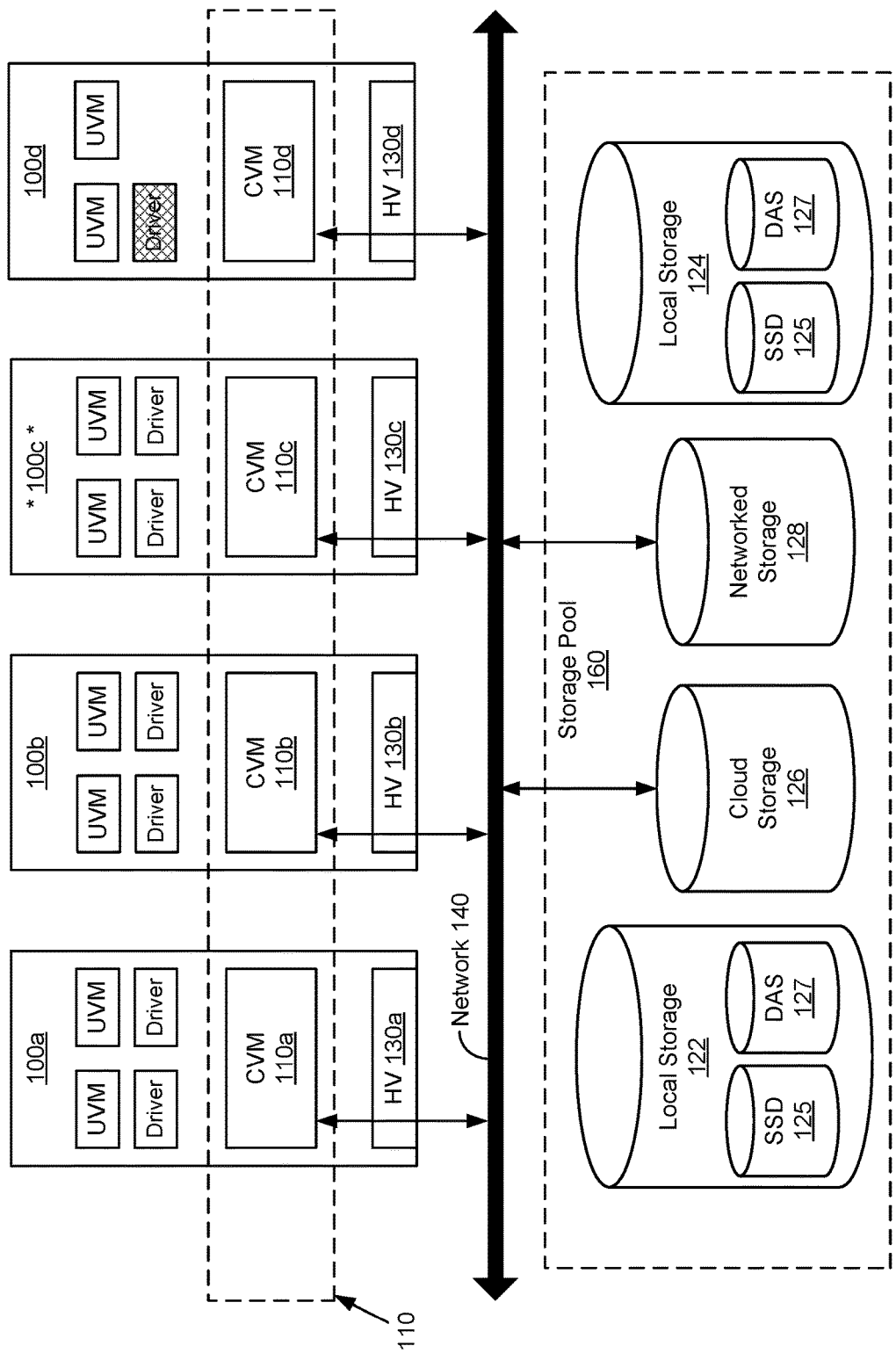
FIGS. 2A-2E illustrate an example architecture for transferring one or more UVMs from a failed node to an available host machine.
Figure 2B:
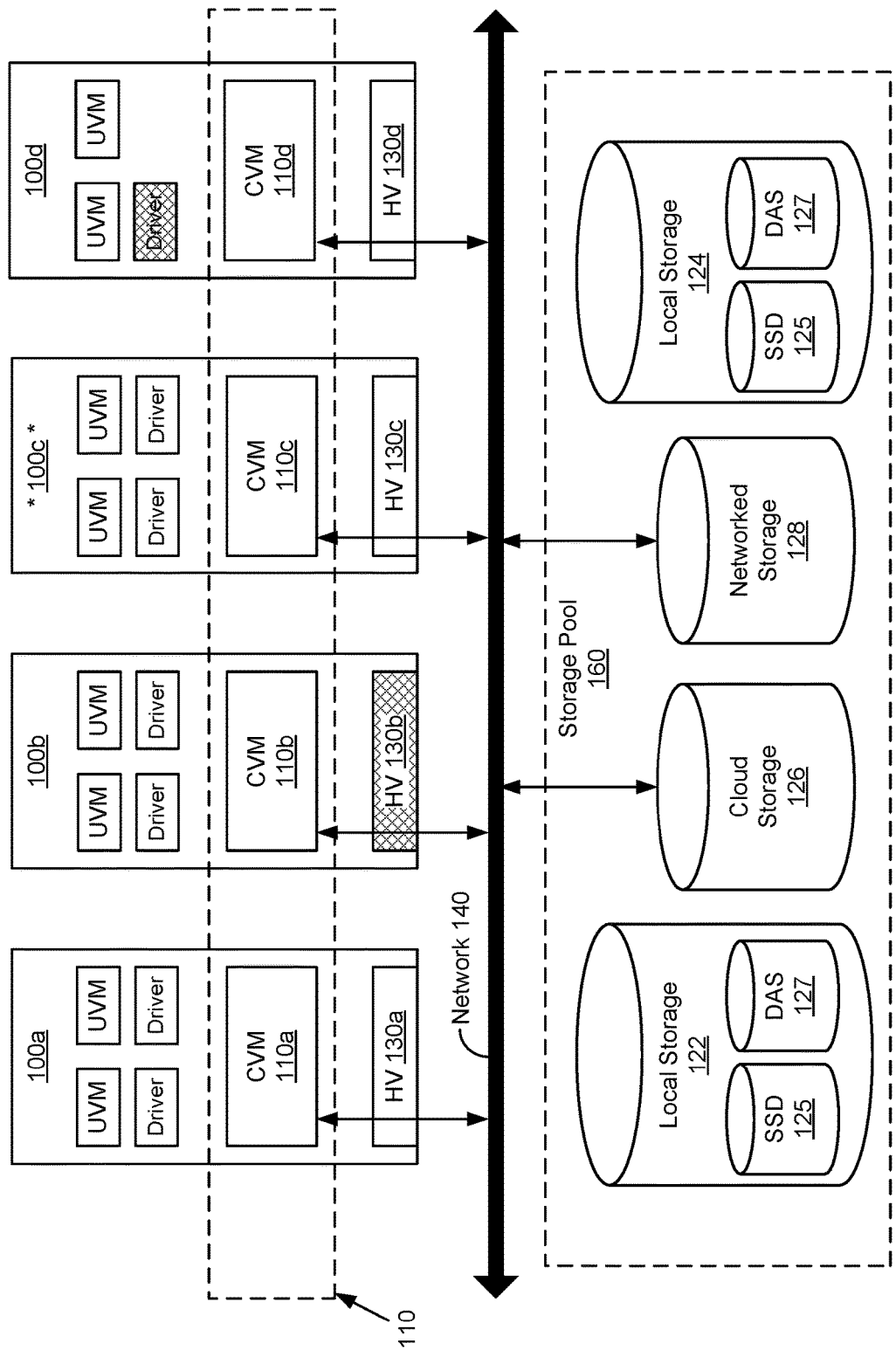

FIG. 2A illustrates a healthy cluster. In a healthy cluster, all nodes may be operating normally. Leader node 100c may be continuously monitoring the operation of the other nodes 100a, 100b, and 100d, as described above. This monitoring may occur via network 140. In particular embodiments, an echo-request may be sent by leader node 100c to a second node, for example, node 100b, by way of one or more I/O controllers located on node 100b. If the leader node receives no echo-response from any of the I/O controllers on 100b, the leader node may determine or confirm that node 100b is unreachable. In particular embodiments, if one or more I/O controllers located on node 100b responds before a predetermined amount of time, the leader node 100c may determine that node 100b is reachable and operating normally. However, if the predetermined amount of time expires before node 100b responds, leader node 100c may determine that node 100b has failed or is otherwise corrupted. In particular embodiments, the predetermined amount of time may be short (e.g., less than 10 milliseconds). In particular embodiments, hypervisor 130b on node 100b may be the only component of node 100b that fails or becomes corrupted. Even in this case, leader node 100c may still determine that the entire node 100b has failed. FIG. 2B illustrates a situation in which node 100b has become unreachable because hypervisor 130b has failed or has otherwise become corrupted. In particular embodiments, a failed node might not actually have failed. An unreachable node may be unreachable for reasons other than node failure. Regardless of the actual operability of the unreachable node, the leader node 100c may treat an unreachable node as a failed node. Thus, in this disclosure, the terms "unreachable" and "failed" may be used interchangeably.

Figure 2C:
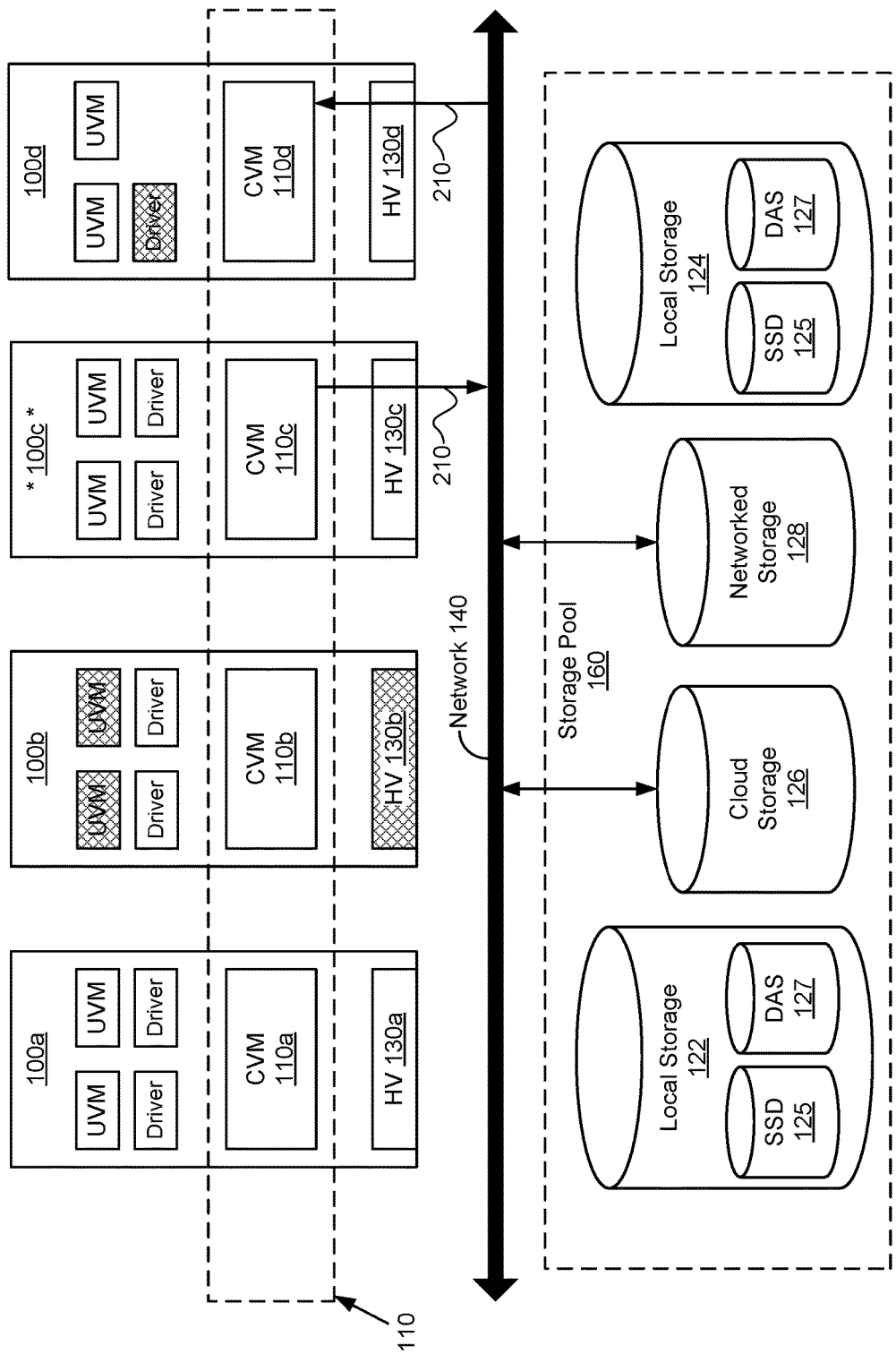

FIG. 2C illustrates, in a first example scenario, steps that the management module in leader node 100c may perform to transfer one or more UVMs from failed node 100b to a target host machine 100d. The management module may identify host machine 100d as a target host machine for the UVMs currently on host machine 100b because target host machine 100d may have available resources such that additional UVMs may be transferred without failure. This may be accomplished by using a host machine that includes a functioning hypervisor, at least one UVM currently running, infrastructure elements (e.g., a wired or wireless network connection), one or more I/O controllers, and a virtual disk. The virtual disk may comprise storage devices and may be accessible by the I/O controllers. As an example and not by way of limitation, host machine 100d may not have as many UVMs or other devices operating on it as other host machines in the cluster, but may otherwise be capable of accommodating one or more additional UVMs. In particular embodiments, once the management module identifies node 100d as a target host machine, the management module may run a first script (e.g., via signal 210 over network 140) that determines whether target host machine 100d has the required drivers installed on it. As an example and not by way of limitation, the management module may run a first script that determines whether target host machine 100d comprises a storage driver, which may be a necessary driver in the operation of a UVM. In the example first scenario of FIG. 2C, target host machine 100d is lacking a required driver. As an example and not by way of limitation, target host machine 100d may be lacking a storage driver. The first script may return information related to the fact that target host machine 100d is lacking a required driver. In particular embodiments, the first script may comprise a list of the drivers needed to operate the UVMs to be transferred to target host machine 100d. In particular embodiments, in response to receiving the first script, target host machine 100d may send back an acknowledgement signal to the management module on node 100c, along with an indication as to whether the target host machine has the required drivers, and whether or not they are activated. In response to the information provided by the first script, the management module may install a package on target host machine 100d that contains all required drivers. The package may be installed, for example, via signal 210 over network 140. Although this disclosure describes determining whether a target host machine contains all required drivers in a particular manner, this disclosure contemplates determining whether a target host machine contains all required drivers in any suitable manner.

Figure 2D:
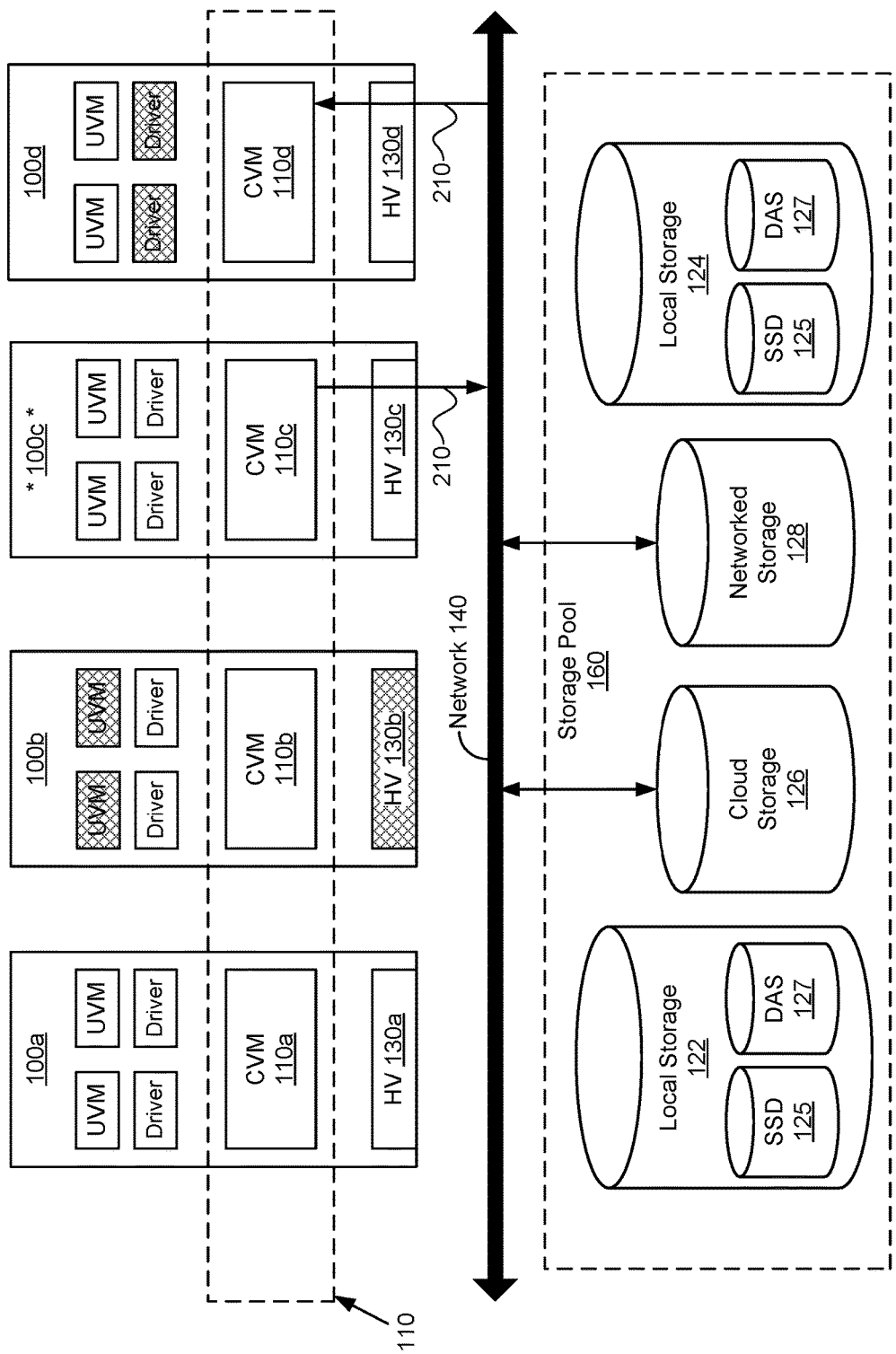

FIG. 2D illustrates, in a second example scenario, steps that the management module in leader node 100c may perform to transfer one or more UVMs from failed node 100b to a target host machine 100d. The management module may identify host machine 100d as a target host machine for the UVMs currently on host machine 100b using the methods described above. In particular embodiments, once the management module identifies node 100d as a target host machine, the management module may run a second script in addition to the first script. The second script may determine whether the drivers on the target host machine 100d are activated. In the second example scenario of FIG. 2D, target host machine 100d may have all the requisite drivers, but the drivers may be inactivated. As an example and not by way of limitation, target host machine 100d may comprise a storage driver that is inactivated. The second script may return information related to the fact that target host machine 100d has one or more inactivated drivers. In response to the information provided by the second script, the management module may activate the inactivated drivers on target machine 100d. The drivers may be activated, for example, via signal 210 over network 140. Although this disclosure describes determining whether drivers on a target host machine are activated in a particular manner, this disclosure contemplates determining whether drivers on a target host machine are activated in any suitable manner.

Figure 2E:
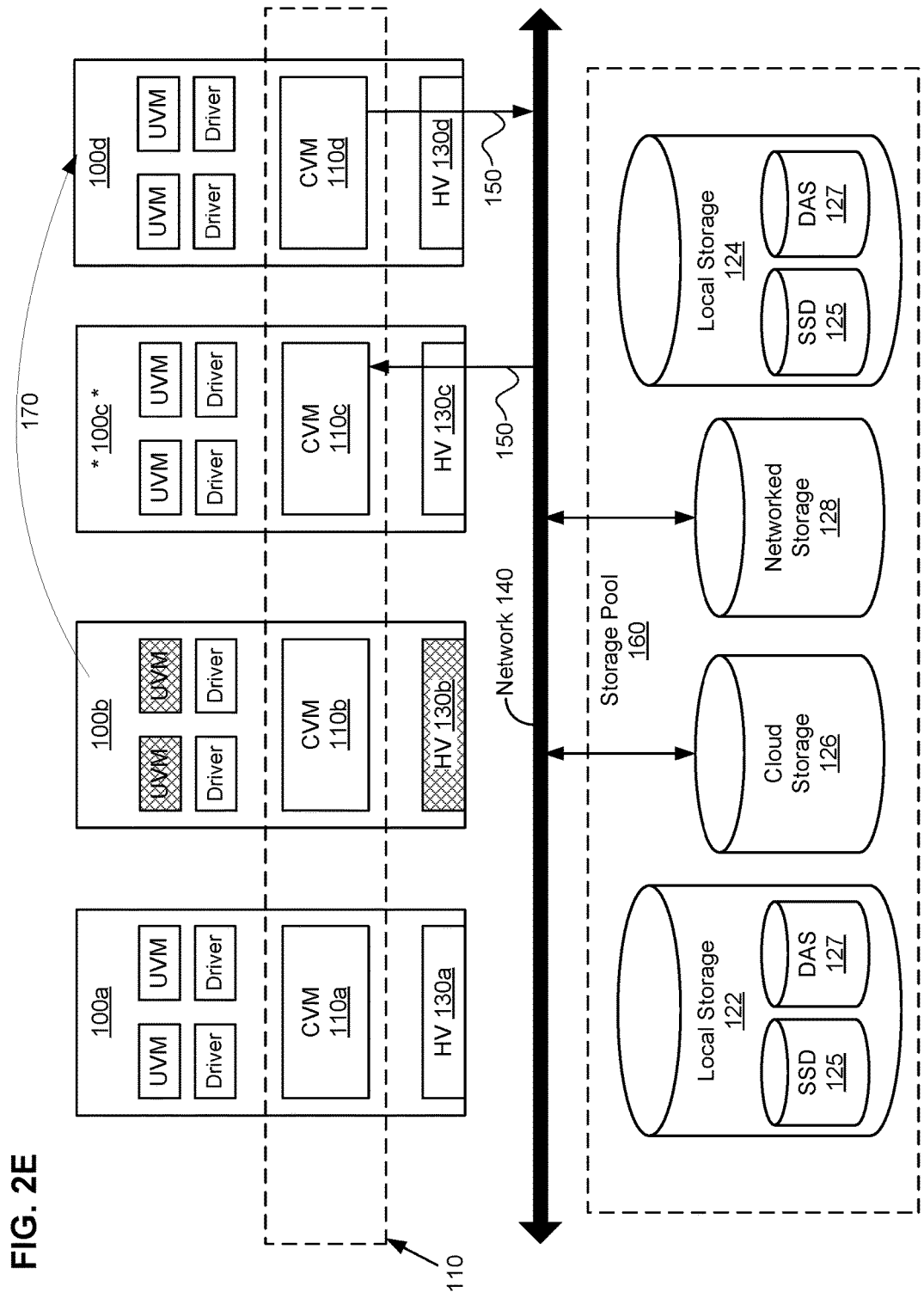

FIG. 2E illustrates steps that the management module in leader node 100c and target host machine 100d may perform to transfer one or more UVMs from failed node 100b to target host machine 100d. Once the required drivers are installed and activated, target host machine 100d may send a signal 150 to the management module on node 100c. Signal 150 may be a signal indicating that the required drivers are installed and activated on target host machine 100d. Upon receiving signal 150, the management module may move the UVMs from 100b over to target host machine 100d. Arrow 170 may represent the UVMs on 100b being transferred to 100d. In particular embodiments, the management module may not wait until target host machine 100d has the required drivers installed and activated before transferring the UVMs from failed node 100b to target host machine 100d. As an example and not by way of limitation, the management module may transfer the UVMs from failed node 100b to target host machine 100d as soon as it determines that target host machine 100d is a suitable host machine for the UVMs, or at any other suitable time. This may occur as soon as the management module determines that target host machine 100d has a functioning hypervisor. As another example and not by way of limitation, management module may transfer the UVMs from failed node 100b to target host machine 100d as soon as it determines that the required drivers are installed on target host machine 100d. This may occur after the first script is sent and received but before the second script is sent. Although this disclosure describes determining that a target host machine has all the required activated drivers in a particular manner, this disclosure contemplates determining that a target host machine has all the required activated drivers in any suitable manner.

In particular embodiments, instead of sending a first script to the target host machine to determine whether the target host machine comprises all the required drivers and a second script to determine whether the drivers on the target host machine are activated, the management module may wait for the target host machine to send a signal indicating as much. When the management module identifies a node as a target host machine, it may notify the target host machine via a signal over network 140 that the node is a target host machine. This signal may comprise a list of the required drivers that the target host machine needs to have in order to maintain the UVMs. Upon receiving this signal, the target host machine may send back an acknowledgement signal to the management module on node 100c, along with an indication as to whether the target host machine has the required drivers, and whether or not they are activated. If the target host machine lacks any required drivers or any of the required drivers are not activated, the management module may install the missing drivers and activate any inactivated drivers using the methods described above. Although this disclosure describes determining whether drivers are installed and activated on a target host machine in a particular manner, this disclosure contemplates determining whether drivers are installed and activated on a target host machine in any suitable manner.

Figure 3:
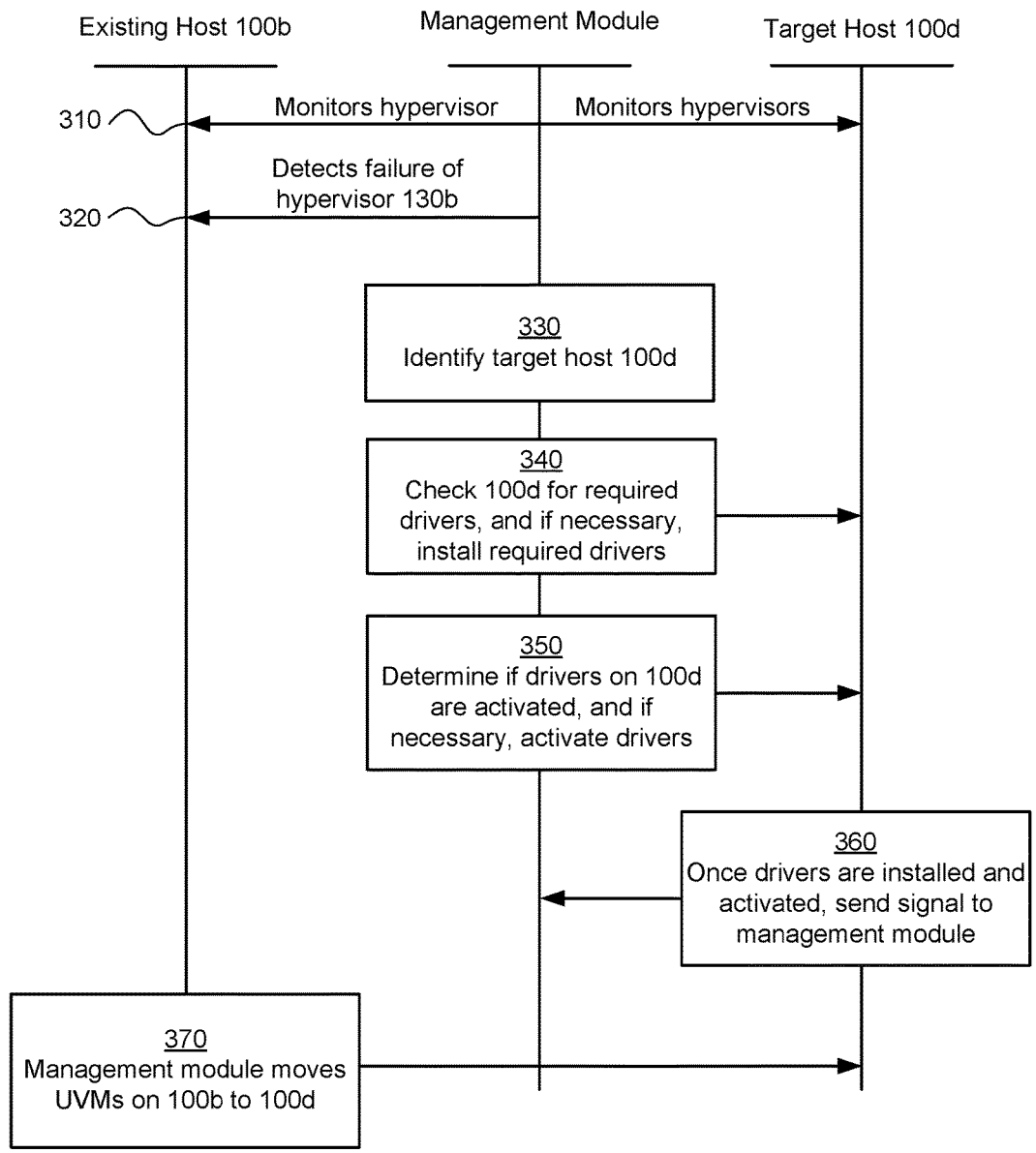
FIG. 3 illustrates an example interaction diagram for transferring one or more UVMs from a failed node to an available host machine.

FIG. 3 illustrates an example interaction diagram for transferring one or more UVMs from a failed node to an available host machine. The interaction diagram may illustrate a system for managing communication connections in a virtualization environment. The system may comprise a cluster of host machines (e.g., nodes) implementing the virtualization environment, wherein each of the host machines comprises a hypervisor, at least one UVM, a connection manager, and an I/O controller (located on a CVM on each node), and wherein a first one of the host machines is designated as a leader node. The system may further comprise a virtual disk comprising a plurality of storage devices, the virtual disk being accessible by all of the I/O controllers, wherein the I/O controllers conduct I/O transactions with the virtual disk based on I/O requests received from the UVMs.

The interaction diagram of FIG. 3 may illustrate a step-by-step process of how the various components in the node cluster interact to transfer one or more UVMs from a failed node to an available host machine. The method may begin at step 310, where a leader node 100c may monitor the operation of the hypervisors on the other nodes 100a, 100b, and 100d. This monitoring may be accomplished by way of a connection manager located on leader node 100c. The connection manager may poll one or more I/O controllers located on the other nodes 100a, 100b, and 100d by periodically "pinging" them (e.g., by sending an echo-request, waiting to receive an echo-response, and, if received, measuring the round-trip time from transmission to reception, reporting errors and packet loss, else if not received, generating an error message). At step 320, the leader node (e.g., CVM 110c) may confirm that a second one of the host machines is unreachable and may transmit an update message to other host machines in the cluster identifying the unreachable host machine. In other words, CVM 110c may have detected that the hypervisor 130b on node 100b has become unresponsive or is otherwise unreachable. At this point, CVM 110c may consider node 100b to have failed, and then CVM 110c may initiate a request blocking procedure. At step 330, the management module may identify a target host machine. This target host machine may be node 100d, and may be selected because target host machine 100d may have available resources such that additional UVMs may be transferred without failure, as described above with reference to FIG. 2C. At step 340, the management module may check target host machine 100d for the required drivers. If target host machine lacks any of the required drivers, the management module may install the required drivers using the methods described herein. At step 350, the management module may determine if the drivers installed on 100d are activated. If any of the drivers are not activated, the management module may activate the drivers using the method described herein. At step 360, the target host machine may determine that it has the required drivers and may send a signal to the management module indicating that the required drivers are installed on target host machine 100d and that all drivers are activated. In particular embodiments, this information may be sent as two separate signals (e.g., a first signal indicating all required drivers are installed, and a second signal indicating that all required drivers are activated). At step 370, in response to receiving the signal from target host machine 100d, the management module may move the UVMs from node 100b to the target host machine 100d. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for transferring one or more UVMs from a failed node to an available host machine including the particular steps of the method of FIG. 3, this disclosure contemplates any suitable method for transferring one or more UVMs from a failed node to an available host machine including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
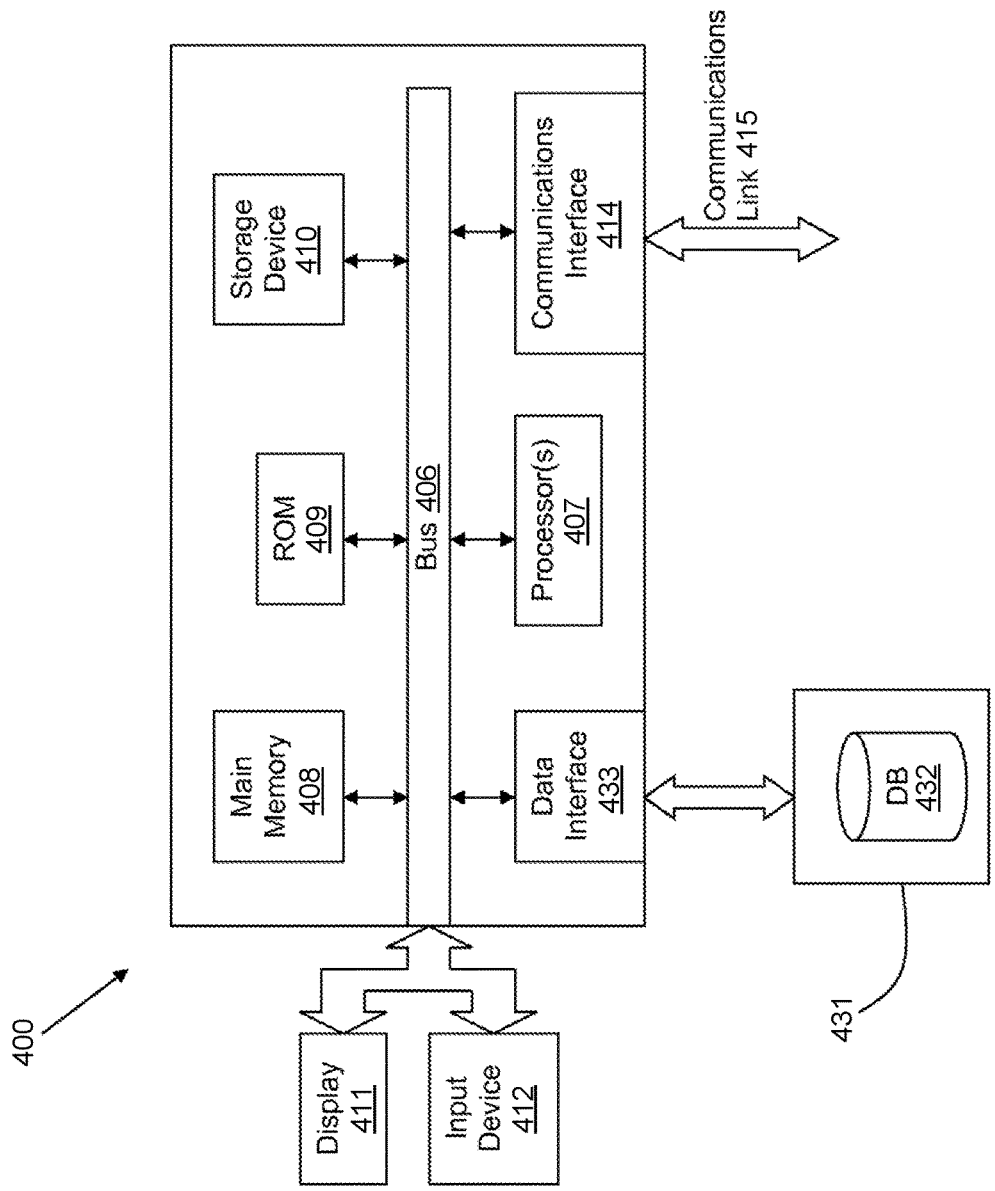
FIG. 4 illustrates a block diagram of a computing system suitable for implementing an embodiment of the present invention.

FIG. 4 is a block diagram of an illustrative computing system 400 suitable for implementing an embodiment of the present invention. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

Computer system 400 includes a bus 406 (e.g., an address bus and a data bus) or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), display 411 (e.g., CRT, LCD, LED), input device 412 (e.g., keyboard, keypad, mouse, microphone). In particular embodiments, computer system 400 may include one or more of any such components.

According to one embodiment of the invention, computer system 400 performs specific operations by processor 407 executing one or more sequences of one or more instructions contained in system memory 408. Such instructions may be read into system memory 408 from another computer readable/usable medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 407 for execution. Such a medium may take many forms, including but not limited to, nonvolatile media and volatile media. Non-volatile media includes, for example, optical or magnetic disks, such as disk drive 410. Volatile media includes dynamic memory, such as system memory 408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. A database 432 in a storage medium 431 may be used to store data accessible by the system 400 by way of data interface 433.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
   a cluster of host machines implementing a virtualization environment based on a first platform, wherein each of the host machines comprises a first hypervisor, and a virtual machine (VM); and;
   a target host machine capable of implementing the virtualization environment based on a second platform, wherein the target host machine comprises a second hypervisor and a management module having programmed instructions that detect failure of the first hypervisor and perform steps to move one of the virtual machines from the cluster of host machines to the target host machine by:
   checking whether the target host machine comprises installed required drivers; and
   if the target host machine comprises the installed required drivers, activating the installed required drivers and sending a confirmation signal back to a control plane in the cluster of host machines.

2. The system of claim 1, further comprising:
   if the target host machine does not comprise the installed required drivers, installing the required drivers on the target host machine, activating the required drivers and sending a confirmation signal back to a control plane in the cluster of host machines.

3. The system of claim 2, wherein the required drivers are comprised within a package.

4. The system of claim 1, further comprising:
   receiving, from the target host machine, a signal indicating that the required drivers are installed and activated on the target host machine.

5. The system of claim 4, further comprising:
   sending instructions to move one of the virtual machines from the cluster of host machines to the target host machine.

6. The system of claim 5, further comprising:
   reconfiguring information for at least one of the virtual machines from the cluster of host machines with respect to the virtual machines moved to the target host machine.

7. The system of claim 1, wherein the target host machine is identified by the management module to receive a user virtual machine (UVM) because the target host machine is capable of maintaining the UVM.

8. One or more computer-readable non-transitory storage media embodying software for managing communication connections in a virtualization environment, the software being operable when executed by a processor to:
   provide a cluster of host machines implementing the virtualization environment based on a first platform, wherein each of the host machines comprises a first hypervisor, a virtual machine (VM), and required drivers;
   provide a target host machine capable of implementing the virtualization environment based on a second platform, wherein the target host machine comprises a second hypervisor; and
   provide a management module having programmed instructions to detect failure of the first hypervisor and, upon detection of failure, to move one of the virtual machines from the cluster of host machines to the target host machine;
   by the management module, check whether the target host machine comprises installed required drivers; and
   by the management module, if the target host machine comprises the installed required drivers, activate the installed required drivers and send a confirmation signal back to a control plane in the cluster of host machines.

9. The computer-readable non-transitory storage media of claim 8, the software being further operable when executed by the processor to:
   if the target host machine does not comprise the required drivers, install the required drivers on the target host machine, activate the required drivers; and sending a confirmation signal back to a control plane in the cluster of host machines.

10. The computer-readable non-transitory storage media of claim 9, wherein the required drivers are comprised within a package.

11. The computer-readable non-transitory storage media of claim 8, the software being further operable when executed by the processor to:
   receive, from the target host machine, a signal indicating that the one or more required drivers are installed and activated on the target host machine.

12. The computer-readable non-transitory storage media of claim 11, the software being further operable when executed by the processor to:
   send instructions to move one of the virtual machines from the cluster of host machines to the target host machine.

13. The computer-readable non-transitory storage media of claim 12, the software being further operable when executed by the processor to:
   reconfigure information for at least one of the virtual machines from the cluster of host machines with respect to the virtual machines moved to the target host machine.

14. The computer-readable non-transitory storage media of claim 8, wherein the target host machine is identified by the management module to receive a user virtual machine.

15. A method comprising:
providing a cluster of host machines implementing the virtualization environment based on a first platform, wherein each of the host machines comprises a first hypervisor, a virtual machine (VM);
providing a target host machine capable of implementing the virtualization environment based on a second platform, wherein the target host machine comprises a second hypervisor; and
detecting failure of the first hypervisor and moving one of the virtual machines from the cluster of host machines to the target host machine by:
checking whether the target host machine comprises installed required drivers; and
if the target host machine comprises the installed required drivers, activating the installed required drivers and sending a confirmation signal back to a control plane in the cluster of host machines.

16. The method of claim 15, further comprising:
if the target host machine does not comprise the required drivers, install the required drivers on the target host machine, activating the required drivers; and sending a confirmation signal back to a control plane in the cluster of host machines.

17. The method of claim 16, wherein the required drivers are comprised within a package.

18. The method of claim 15, further comprising:
receiving, from the target host machine, a signal indicating that the required drivers are installed and activated on the target host machine.

19. The method of claim 18, further comprising:
sending instructions to move one of the virtual machines from the cluster of host machines to the target host machine.

20. The method of claim 19, further comprising:
reconfiguring information for at least one of the virtual machines from the cluster of host machines with respect to the virtual machines moved to the target host machine.

* * * * *

UNITED STATES PATENT AND TRADEMARK OFFICE
CERTIFICATE OF CORRECTION

PATENT NO. : 10,454,773 B2  
APPLICATION NO. : 15/362715  
DATED : October 22, 2019  
INVENTOR(S) : Constantine Andrew Kousoulis et al.

Page 1 of 2

It is certified that error appears in the above-identified patent and that said Letters Patent is hereby corrected as shown below:

In the Specification

Column 5, Line 37, replace "," with --and--.

Column 5, Line 38, replace "else" with --else,--.

Column 8, Line 43, replace "," with --and--.

Column 8, Line 44, replace "else" with --else,--.

Column 9, Line 6, delete ",".

In the Claims

Column 11, Line 33, cancel the text beginning with "1. A system, comprising" to and ending "host machines." in Column 11, Line 51, and insert the following claim:
--1. A system, comprising:
a cluster of host machines implementing a virtualization environment based on a first
    platform, wherein each of the host machines comprises a first hypervisor and a virtual
    machine;
a target host machine capable of implementing the virtualization environment based on a
    second platform, wherein the target host machine comprises a second hypervisor; and
a management module having programmed instructions that detect failure of the first
    hypervisor and perform steps to move one of the virtual machines from the cluster of
    host machines to the target host machine by:
    checking whether the target host machine comprises installed required drivers; and
    if the target host machine comprises the installed required drivers, activating the
        installed required drivers and sending a confirmation signal back to a control
        plane in the cluster of host machines.--.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,454,773 B2

In Column 11, Line 52, replace "further comprising" with --the management module having further programmed instructions that--.

In Column 11, Line 54, replace "installing" with --install--.

In Column 11, Line 56, replace "sending" with --send--.

In Column 11, Line 60, replace "further comprising" with --the management module having further programmed instructions that--.

In Column 11, Line 61, replace "receiving" with --receive--.

In Column 11, Line 64, replace "further comprising" with --the management module having further programmed instructions that--.

In Column 11, Line 65, replace "sending" with --send--.

In Column 12, Line 1, replace "further comprising" with --the management module having further programmed instructions that--.

In Column 12, Line 2, replace "reconfiguring" with --reconfigure--.

In Column 12, Line 17, delete "(VM)".

In Column 12, Line 40, replace "drivers; and sending" with --drivers and send--.

In Column 13, Line 2, replace "the" with --a--.

In Column 13, Line 5, replace "," with --and-- and delete "(VM)".